United States Patent [19]

Hirahara et al.

[11] Patent Number: 5,432,135
[45] Date of Patent: Jul. 11, 1995

[54] DIELECTRIC CERAMIC COMPOSITION FOR HIGH FREQUENCY

[75] Inventors: Seiichi Hirahara; Nobuyoshi Fujikawa, both of Kokubu; Tsuguo Koyasu; Sumie Koyasu, both of Kibie, all of Japan

[73] Assignee: Kyocera Corporation, Kyoto, Japan

[21] Appl. No.: 168,645

[22] Filed: Dec. 16, 1993

[30] Foreign Application Priority Data

Dec. 17, 1992 [JP] Japan ............................. 4-337414

[51] Int. Cl.$^6$ ............................................. C04B 35/04
[52] U.S. Cl. ................................. 501/135; 501/138; 501/139
[58] Field of Search ......................... 501/135, 138, 139

[56] References Cited

U.S. PATENT DOCUMENTS

5,268,341 12/1993 Koyasu et al. .................. 501/135

FOREIGN PATENT DOCUMENTS

| 0452945 | 10/1991 | European Pat. Off. | 501/135 |
| 3444340 | 6/1985 | Germany | 501/135 |
| 1040869 | 2/1986 | Japan | 501/135 |
| 1078007 | 4/1986 | Japan | 501/135 |
| 1142602 | 6/1986 | Japan | 501/135 |
| 4005509 | 1/1992 | Japan | 501/135 |

*Primary Examiner*—Deborah Jones
*Attorney, Agent, or Firm*—Spensley Horn Jubas & Lubitz

[57] ABSTRACT

A dielectric ceramic composition for high frequency-use comprising a composition (A) containing at least Ba, Mg and W as metal elements represented by a composition formula expressed in a mole ratio of these metal elements, $xBaO \cdot yMgO \cdot zWO_3$, in which x, y and z satisfy the following relation $40 \leq x \leq 60$,
$13 \leq y \leq 40$,
$20 \leq z \leq 30$, and
$x + y + z = 100$, and at least one element (B) selected from Group 3a elements and Group 4a elements in the periodic table, Sn, Mn and Ca. A ceramic molded product composed of this composition has a high dielectric constant and a high Q value in a high frequency region of at least 10 GHz but also has a temperature coefficient ($\tau f$) of a resonance frequency which is not shifted too much to a negative side and has a suitable value. Accordingly, the composition may be preferably used as a resonator and a dielectric substrate material for MIC in a high frequency region of a microwave or a millimeter wave.

8 Claims, No Drawings

DIELECTRIC CERAMIC COMPOSITION FOR HIGH FREQUENCY

BACKGROUND OF THE INVENTION

1. Field of the Invention

This invention relates to a dielectric ceramic composition having a high dielectric constant and a high Q value in a high frequency region such as a microwave and a millimeter wave and a preferred temperature coefficient of a resonance frequency.

2. Description of the Prior Art

In a high frequency region such as a microwave and a millimeter wave, dielectric ceramics are widely used as a dielectric resonator or a dielectric substrate for MIC.

For example, $ZrO_2$-$SnO_2$-$TiO_2$ type materials, BaO-$TiO_2$ materials, (Ba, Sr) (Zr, Ti)$O_3$ type materials, and Ba (Zn, Ta)$O_3$ type materials have been known as dielectric ceramics of this type. These materials have a dielectric constant of 20 to 30 and a Q value of 1000 to 3000 at a frequency of 500 MHz to 5 GHz by various improvement and further possess a temperature coefficient ($\tau f$) of a resonance frequency of about 0 ppm/°C.

However, the frequencies used recently have tended to become higher and dielectric materials have been required to have superior dielectric properties, especially a high Q value. But conventional dielectric materials do not at present have a high Q value of a high practical level in a used frequency region of 10 GHz.

The present inventors previously proposed a dielectric ceramic composition comprising a complex oxide containing BaO, MgO and $WO_3$ as a composition having a high dielectric constant and a high Q value in a high frequency region which can meet this requirement (Japanese Patent Application No. 284,470/1991).

However, a high Q value can be obtained in this dielectric ceramic composition, but since the temperature coefficient ($\tau f$) of the resonance frequency is too much biased to a negative side, its field of utilization is limited when it is used as a microwave dielectric ceramic material. Thus, there is a problem in the field of practical utilization.

The present inventors have investigated the above problem, and as a result, have found that the temperature coefficient ($\tau f$) of the resonance frequency can be transferred to a suitable value on a more positive side by including a predetermined amount of at lease one element selected from Group 3b elements, Group 4b elements in the periodic table, Sn, Mn and Ca in a complex oxide expressed by BaO-MgO-$WO_3$. Thus, the present invention has been completed.

SUMMARY OF THE INVENTION

It is an object of this invention to provide a dielectric ceramic composition having a high dielectric constant and a high Q value in a high frequency region of at least 10 GHz and possessing an improved preferable temperature coefficient ($\tau f$) of the resonance frequency.

According to the invention, there is provided a dielectric ceramic composition for high frequency-use comprising a composition (A) containing at least Ba, Mg and W as metal elements represented by a composition formula expressed in a mole ratio of these metal elements, xBaO.yMgO.z$WO_3$, in which x, y and z satisfy the following relation $40 \leq x \leq 60$,
$13 \leq y \leq 40$,
$20 \leq z \leq 30$, and
$x+y+z=100$, and at least one element (B) selected from Group 3b elements and Group 4b elements in the periodic table, Sn, Mn and Ca.

DETAILED DESCRIPTION OF THE PREFERRED EMBODIMENT

In the present invention, of at least one specified metal element selected from Group 3b elements and Group 4b elements in the periodic table, Sn, Mn and Ca is included into a metal complex oxide at least containing Ba, Mg and W as metal elements in which the composition formula expressed in mole ratios of metal elements represented by xBaO.yMgO.z$WO_3$ wherein x, y and z are defined as above to form a ceramic composition.

The amounts of metal oxides constituting the main component are specified as above. If the amount of BaO (x) is less than 40, the Q value decreases. If it is more than 60, it becomes difficult to sinter the composition. Furthermore, if the amount of MgO (y) is less than 13, the sinterability of the composition is difficult to achieve and the Q value decreases. And if it is more than 40, the Q value decreases. Furthermore, if the amount of $WO_3$ (z) is less than 20, the sinterability of the composition decreases. If it is more than 30, the Q value poses a problem if decreasing.

Furthermore, by including at least one specific metal element, such as Y, Ti, Zr, Sn, Mn, Ca, Hf, La, Ce, Nd, Pr and Sm into the BaO-MgO-$WO_3$ type composition, it is possible to transfer the temperature coefficient of the resonance frequency to a positive side and is maintained at a suitable value.

The amounts of these metal elements based on the BaO-MgO-$WO_3$ composition are preferably about 30 mole parts or less per 100 mole parts of the composition.

If the amount added of the metal element (B) is too much above 30 mole parts, the resulting ceramic composition has a markedly lowered Q value. Or when Y or Ca is added, the temperature coefficient ($\tau f$) of the resonance frequency is transferred to much on a positive side. In order that the Q value may be maintained at least 3000 and the characteristics of the dielectric ceramic for high frequencies may be exhibited fully, if the element (B) is a Group 3b element, its amount may preferably be 0.1 to 30 mole parts per 100 mole parts of the composition. If the element (B) is Y, its amount is 10 0.1 to 30 mole parts. If the element (B) is a lanthanoid element such as La, Ce, Nd, Pr and Sm, its amount is 0.1 to 26.3 mole parts.

If the element (B) is an element selected from the 4b Group in the periodic table, Sn, Mn or Ca, its amount added is preferably 0.1 to 20 mole parts per 100 mole parts of the composition (A). Especially when the element (B) is Ca, its amount is preferably 0.1 to 15 mole parts, and when the element (B) is Ti, Sn or Mn, its amount is preferably 0.1 to 10 mole parts. Furthermore, in order to adjust the temperature coefficient ($\tau f$) of the resonance frequency in a range within ±30, and adjust the Q value to at least 3000, Y and La are especially preferably added in an amount of 0.1 to 20 mole parts and it is especially preferred to add Nd, Pr and Sm in an amount of 0.1 to 15 mole parts.

In the present invention, the element (B) sufficiently exhibits its efficacy when one type is added. But it is possible to add a plurality of elements (B) in combination. In this case, the amounts of the elements (B) may preferably 30 mole parts or less as a total.

A preferred example of a combination of a plurality of elements (B) is a combination of Mn and Y added in the amounts within the above range.

Furthermore, the presence of Fe, Cr, V, Al and Si in the above BaO-MgO-WO₃ type dielectric composition tends to further increase the temperature coefficient of the resonance frequency on the negative side. It is desirable in this invention to limit the amounts of these metal elements to 5 mole parts or less for 100 mole parts of a main component composed of BaO-MgO-WO₃ including impurities.

A method of producing the ceramic in accordance with this invention, for example, comprises using oxides of Ba, Mg and W or using metal salts such as carbonate salts or sulfate salts forming oxides by firing as a starting material, or preparing oxides of Ti, Zr, Sn, Mn, Ca, Hf, La, Ce, Nd, Pr, Sm, Y, etc., or metal salts such as carbonate salts and sulfate salts forming oxides by firing, weighing these compounds so as to be in the amounts of the above range, and then sufficiently mixing them. Thereafter, the mixture is calcined at 900°–1200° C. calcination, and pulverized. The calcined powder is then molded into a desired shape by a known molding method such as a pressing or a doctor blade method.

Thereafter, the molded article is fired at 1300° C. to 1600° C. in an oxidizing atmosphere such as atmospheric air to obtain a dielectric ceramic.

In the dielectric ceramic composition of this invention, by varying the mole ratios of BaO, MgO and WO₃ and the amounts added of the specified elements (B), the temperature coefficient of the resonance frequency can be freely controlled within a predetermined range from a negative side to a positive side.

For example, a ceramic composed of 50 mole % of BaO, 25 mole % of MgO, and 25 mole % of WO₃ has a dielectric constant of 20 at a frequency of 10 GHz4 to be measured and a Q value of as high as 12000, but the temperature coefficient (τf) of the resonance frequency is as great as −30 ppm on the negative side. On the basis of the present invention, the temperature coefficient (τf) can be controlled to the positive side from −30 ppm/°C. by including the aforeside metal element.

While maintaining a high Q value, the temperature characteristic of the resonance frequency can be transferred from the negative side to the positive side by limiting the amount added of the specified element (B), below the predetermined amount.

As stated in detail above, according to the present invention, by compounding a predetermined amount of a specific element into a main component composed of BaO, MgO and WO₃, the temperature coefficient (τf) of the resonance frequency can be transferred from the negative side to the positive side, and the temperature coefficient can be freely controlled.

By this mechanism, the dielectric ceramic composition of the present invention cab e fully applied to various resonator materials and dielectric substrate materials for MIC.

EXAMPLES

As starting materials, $BaCO_3$, $MgCO_3$ and $WO_3$ having a purity of at least 99%, and at least one metal oxide powder selected from Ti, Zr, Sn, Mn, Ca, Hf, La, Ce, Nd, Pr, Sm and Y were used weighed in proportions shown in Tables 1 to 3. They were put into a ball mill lined with rubber together with water, and wet-mixed for 8 hours. Thereafter, the mixture was dehydrated, dried, and calcined at 1000° C. for 2 hours. The calcined product was put into a ball mill containing water and an organic binder and wet-pulverized for 8 hours.

Thereafter, the pulverized product was dried, and granulated through a No. 50-mesh sieve, and the resulting powder was molded into a cylindrical shape of 10 mm$\phi$×5 mm$\phi$ at a pressure of 3000 kg/cm². Furthermore, this cylinder was fired at 1400° to 1600° C. for 6 hours to form a ceramic sample.

The specific dielectric constants (τf) at a frequency of 10 GHz and Q values by a dielectric resonator method were measured, and furthermore, temperature changes in a resonance frequency from a temperature of 25° C. to 85° C. were measured with respect to the resulting samples. The temperature coefficients (τf) of resonance frequencies were calculated from the following formula.

$$\tau f = \frac{f(85° C.) - f(25° C.)}{f(25° C.)} \times \frac{1}{(85° C. - 25° C.)} \times 10^6 (ppm/°C.)$$

in which f(25° C.) is a resonance frequency at 25° C., and f(85° C.) is a resonance frequency at 85° C. The results are shown in Tables 1 to 3.

TABLE 1

| Sample No. | Main components (mole %) BaO | MgO | WO₃ | Additive (mole parts) | | Dielectric constant (εr) | Q value | Temperature coefficient (τf) of resonant frequency (ppm/°C.) |
|---|---|---|---|---|---|---|---|---|
| *1 | 50 | 25 | 25 | — | | 20.0 | 12000 | −30 |
| 2 | 50 | 25 | 25 | YO₃/₂ | 0.1 | 19.5 | 12000 | −29 |
| 3 | 50 | 25 | 25 | YO₃/₂ | 2.0 | 17.4 | 13000 | −21 |
| 4 | 50 | 25 | 25 | YO₃/₂ | 5.0 | 17.7 | 9300 | −16 |
| 5 | 50 | 25 | 25 | YO₃/₂ | 15.0 | 17.5 | 4200 | −8 |
| 6 | 50 | 25 | 25 | YO₃/₂ | 30.0 | 17.5 | 4200 | +21 |
| *7 | 50 | 25 | 25 | YO₃/₂ | 40.0 | 17.1 | 2800 | +36 |
| *8 | 35.0 | 40 | 25 | YO₃/₂ | 5.0 | 16.1 | 1000 | — |
| 9 | 40.0 | 35 | 25 | YO₃/₂ | 10.0 | 18.5 | 3500 | +5 |
| 10 | 49.7 | 24.2 | 26.0 | YO₃/₂ | 3.6 | 19.7 | 14000 | −18 |
| 11 | 51.6 | 22.4 | 26.1 | YO₃/₂ | 7.5 | 19.4 | 17000 | −8 |
| 12 | 53.6 | 20.3 | 26.1 | YO₃/₂ | 11.6 | 19.1 | 18000 | +10 |
| 13 | 55.7 | 18.1 | 26.2 | YO₃/₂ | 16.1 | 18.8 | 15000 | +25 |
| 14 | 58.1 | 15.7 | 26.2 | YO₃/₂ | 21.0 | 18.5 | 8000 | +40 |
| 15 | 60.0 | 13.0 | 27.0 | YO₃/₂ | 26.3 | 18.2 | 6000 | +60 |
| *16 | 63.4 | 10.3 | 26.3 | YO₃/₂ | 32.0 | 17.9 | 2000 | +85 |
| 17 | 40.0 | 40.0 | 20.0 | YO₃/₂ | 5.0 | 15.0 | 3300 | +20 |
| *18 | 35.0 | 45.0 | 20.0 | YO₃/₂ | 10.0 | — | <100 | — |

TABLE 1-continued

| Sample No. | Main components (mole %) | | | Additive (mole parts) | | Dielectric constant ($\epsilon r$) | Q value | Temperature coefficient ($\tau f$) of resonant frequency (ppm/°C.) |
|---|---|---|---|---|---|---|---|---|
| | BaO | MgO | $WO_3$ | | | | | |
| 19 | 50.0 | 20.0 | 30.0 | $YO_{3/2}$ | 5.0 | 16.5 | 3500 | −11 |
| *20 | 50.0 | 35.0 | 15 | $YO_{3/2}$ | 5.0 | — | <100 | — |
| *21 | 45.0 | 20.0 | 35 | $YO_{3/2}$ | 10.0 | — | <100 | — |
| 22 | 50 | 25 | 25 | $HfO_2$ | 0.1 | 18.9 | 12000 | −27 |
| 23 | 50 | 25 | 25 | $HfO_2$ | 2.0 | 18.4 | 12000 | −26 |
| 24 | 50 | 25 | 25 | $HfO_2$ | 10.0 | 18.2 | 5100 | −21 |
| 25 | 50 | 25 | 25 | $HfO_2$ | 15.0 | 18.0 | 3300 | −20 |
| *26 | 50 | 25 | 25 | $HfO_2$ | 30.0 | 35.0 | <100 | — |
| *27 | 35.0 | 40.0 | 25.0 | $HfO_2$ | 5.0 | — | <100 | — |
| 28 | 40.0 | 35.0 | 25.0 | $HfO_2$ | 5.0 | 17.2 | 3600 | −8 |
| 29 | 40.0 | 40.0 | 20.0 | $HfO_2$ | 5.0 | 13.8 | 3200 | +25 |
| *30 | 35.0 | 45.0 | 20.0 | $HfO_2$ | 5.0 | — | <100 | — |
| 31 | 50.0 | 20.0 | 30.0 | $HfO_2$ | 5.0 | 14.8 | 3400 | −18 |
| *32 | 50.0 | 35.0 | 15 | $HfO_2$ | 5.0 | | poor sintering | |
| *33 | 45.0 | 20.0 | 35 | $HfO_2$ | 5.0 | — | <100 | — |
| 34 | 50 | 25 | 25 | $ZrO_2$ | 0.1 | 18.3 | 11000 | −28 |
| 35 | 50 | 25 | 25 | $ZrO_2$ | 2.0 | 18.5 | 13000 | −26 |
| 36 | 50 | 25 | 25 | $ZrO_2$ | 5.0 | 18.2 | 12000 | −22 |
| 37 | 50 | 25 | 25 | $ZrO_2$ | 15.0 | 18.6 | 7100 | −12 |
| 38 | 50 | 25 | 25 | $ZrO_2$ | 20.0 | 18.6 | 3600 | +2 |
| 39 | 50 | 25 | 25 | $ZrO_2$ | 30.0 | — | <100 | — |
| *40 | 35.0 | 40.0 | 25.0 | $ZrO_2$ | 5.0 | — | <100 | — |
| 41 | 40.0 | 35.0 | 25.0 | $ZrO_2$ | 5.0 | 16.9 | 3300 | −5 |
| 42 | 40.0 | 40.0 | 20.0 | $ZrO_2$ | 5.0 | 14.2 | 3500 | +28 |
| *43 | 35.0 | 45.0 | 20.0 | $ZrO_2$ | 5.0 | — | <100 | — |
| 44 | 50.0 | 20.0 | 30.0 | $ZrO_2$ | 5.0 | 14.9 | 3200 | −15 |
| *45 | 50.0 | 35.0 | 15 | $ZrO_2$ | 5.0 | — | <100 | — |
| *46 | 45.0 | 20.0 | 35 | $ZrO_2$ | 5.0 | — | <100 | — |
| 47 | 50 | 25 | 25 | $MnO_2$ | 0.1 | 20.2 | 13000 | −30 |
| 48 | 50 | 25 | 25 | $MnO_2$ | 2.0 | 18.7 | 18000 | −28 |
| 49 | 50 | 25 | 25 | $MnO_2$ | 5.0 | 19.3 | 8400 | −25 |
| 50 | 50 | 25 | 25 | $MnO_2$ | 10.0 | 19.0 | 4000 | −22 |
| 51 | 50 | 25 | 25 | $MnO_2$ | 15.0 | 19.4 | 1700 | −20 |
| *52 | 50 | 25 | 25 | $MnO_2$ | 30.0 | — | <100 | — |
| *53 | 35.0 | 40.0 | 25.0 | $MnO_2$ | 5.0 | — | <100 | — |
| 54 | 40.0 | 35.0 | 25.0 | $MnO_2$ | 5.0 | 18.1 | 3700 | −8 |
| 55 | 40.0 | 40.0 | 20.0 | $MnO_2$ | 5.0 | 15.2 | 3800 | +25 |
| *56 | 35.0 | 45.0 | 20.0 | $MnO_2$ | 5.0 | — | <100 | — |
| 57 | 50.0 | 20.0 | 30.0 | $MnO_2$ | 5.0 | 16.5 | 3500 | −18 |
| *58 | 50.0 | 35.0 | 15 | $MnO_2$ | 5.0 | — | <100 | — |
| *59 | 45.0 | 20.0 | 35 | $MnO_2$ | 5.0 | — | <100 | — |

*; shows the samples outside the present invention.

TABLE 2

| Sample No. | Main components (mole %) | | | Additive (mole parts) | | Dielectric constant ($\epsilon r$) | Q value | Temperature coefficient ($\tau f$) of resonant frequency (ppm/°C.) |
|---|---|---|---|---|---|---|---|---|
| | BaO | MgO | $WO_3$ | | | | | |
| 60 | 50 | 25 | 25 | $SnO_2$ | 0.1 | 20.0 | 13000 | −29 |
| 61 | 50 | 25 | 25 | $SnO_2$ | 2.0 | 19.0 | 11000 | −27 |
| 62 | 50 | 25 | 25 | $SnO_2$ | 5.0 | 17.7 | 5100 | −28 |
| 63 | 50 | 25 | 25 | $SnO_2$ | 10.0 | 16.3 | 3000 | −29 |
| *64 | 35.0 | 40.0 | 25.0 | $SnO_2$ | 5.0 | — | <100 | — |
| 65 | 40.0 | 35.0 | 25.0 | $SnO_2$ | 5.0 | 16.7 | 3400 | −11 |
| 66 | 40.0 | 40.0 | 20.0 | $SnO_2$ | 5.0 | 14.1 | 3200 | +22 |
| *67 | 35.0 | 45.0 | 20.0 | $SnO_2$ | 5.0 | — | <100 | — |
| 68 | 50.0 | 20.0 | 30.0 | $SnO_2$ | 5.0 | 14.8 | 3500 | −20 |
| *69 | 50.0 | 35.0 | 15 | $SnO_2$ | 5.0 | | poor sintering | |
| *70 | 45.0 | 20.0 | 35 | $SnO_2$ | 5.0 | — | <100 | — |
| 71 | 50 | 25 | 25 | $TiO_2$ | 0.1 | 18.9 | 9300 | −28 |
| 72 | 50 | 25 | 25 | $TiO_2$ | 2.0 | 18.2 | 5100 | −16 |
| 73 | 50 | 25 | 25 | $TiO_2$ | 5.0 | 18.3 | 4700 | −2 |
| 74 | 50 | 25 | 25 | $TiO_2$ | 10.0 | 18.5 | 3500 | +14 |
| 75 | 50 | 25 | 25 | $TiO_2$ | 15.0 | 18.8 | 630 | +29 |
| *76 | 35.0 | 40.0 | 25.0 | $TiO_2$ | 5.0 | — | <100 | — |
| 77 | 40.0 | 35.0 | 25.0 | $TiO_2$ | 5.0 | 17.2 | 3400 | +15 |
| 78 | 40.0 | 40.0 | 20.0 | $TiO_2$ | 5.0 | 14.1 | 3100 | +46 |
| *79 | 35.0 | 45.0 | 20.0 | $TiO_2$ | 5.0 | — | <100 | — |
| 80 | 50.0 | 20.0 | 30.0 | $TiO_2$ | 5.0 | 15.3 | 3300 | +5 |
| *81 | 50.0 | 35.0 | 15 | $TiO_2$ | 5.0 | — | <100 | — |
| *82 | 45.0 | 20.0 | 35 | $TiO_2$ | 5.0 | — | <100 | — |
| 83 | 50 | 25 | 25 | CaO | 0.1 | 19.5 | 8300 | −28 |
| 84 | 50 | 25 | 25 | CaO | 2.0 | 19.2 | 4100 | −21 |
| 85 | 50 | 25 | 25 | CaO | 5.0 | 17.8 | 6200 | −12 |
| 86 | 50 | 25 | 25 | CaO | 15.0 | 16.6 | 4700 | +24 |

TABLE 2-continued

| Sample No. | Main components (mole %) | | | Additive (mole parts) | | Dielectric constant (εr) | Q value | Temperature coefficient (τf) of resonant frequency (ppm/°C.) |
|---|---|---|---|---|---|---|---|---|
| | BaO | MgO | WO$_3$ | | | | | |
| 87 | 50 | 25 | 25 | CaO | 20.0 | 15.5 | 2400 | +29 |
| *88 | 50 | 25 | 25 | CaO | 40.0 | 14.3 | 600 | +35 |
| *89 | 35.0 | 40.0 | 25.0 | CaO | 5.0 | — | <100 | — |
| 90 | 40.0 | 35.0 | 25.0 | CaO | 5.0 | 15.9 | 3500 | +5 |
| 91 | 40.0 | 40.0 | 20.0 | CaO | 5.0 | 15.2 | 3600 | +38 |
| *92 | 35.0 | 45.0 | 20.0 | CaO | 5.0 | — | <100 | — |
| 93 | 50.0 | 20.0 | 30.0 | CaO | 5.0 | 14.7 | 3100 | −5 |
| *94 | 50.0 | 35.0 | 15 | CaO | 5.0 | | poor sintering | |
| *95 | 45.0 | 20.0 | 35 | CaO | 5.0 | — | <100 | — |
| 96 | 50 | 25 | 25 | LaO$_{3/2}$ | 0.1 | 20.0 | 6600 | −28 |
| 97 | 50 | 25 | 25 | LaO$_{3/2}$ | 2.0 | 20.1 | 4100 | −13 |
| 98 | 50 | 25 | 25 | LaO$_{3/2}$ | 5.0 | 20.4 | 3100 | −10 |
| 99 | 50 | 25 | 25 | LaO$_{3/2}$ | 15.0 | 19.8 | 3300 | −2 |
| *100 | 50 | 25 | 25 | LaO$_{3/2}$ | 30.0 | — | <100 | — |
| 101 | 49.7 | 24.2 | 26.0 | LaO$_{3/2}$ | 3.6 | 20.1 | 8500 | −18 |
| 102 | 51.6 | 22.4 | 26.1 | LaO$_{3/2}$ | 7.5 | 19.8 | 8900 | −3 |
| 103 | 53.6 | 20.3 | 26.1 | LaO$_{3/2}$ | 11.6 | 19.5 | 6300 | +9 |
| 104 | 55.7 | 18.1 | 26.2 | LaO$_{3/2}$ | 16.1 | 20.5 | 6000 | +20 |
| 105 | 58.1 | 15.7 | 26.2 | LaO$_{3/2}$ | 21.0 | 19.0 | 4100 | +34 |
| 106 | 60.6 | 13.1 | 26.3 | LaO$_{3/2}$ | 26.3 | 19.2 | 5500 | +43 |
| *107 | 63.4 | 10.3 | 26.3 | LaO$_{3/2}$ | 32.0 | 19.4 | 1600 | +53 |
| *108 | 35.0 | 40.0 | 25.0 | LaO$_{3/2}$ | 5.0 | 18.6 | 700 | — |
| 109 | 40.0 | 35.0 | 25.0 | LaO$_{3/2}$ | 5.0 | 19.1 | 3700 | +7 |
| 110 | 40.0 | 40.0 | 20.0 | LaO$_{3/2}$ | 5.0 | 17.9 | 3100 | +20 |
| *111 | 35.0 | 45.0 | 20.0 | LaO$_{3/2}$ | 5.0 | — | <100 | — |
| 112 | 50.0 | 20.0 | 30.0 | LaO$_{3/2}$ | 3.0 | 18.9 | 3300 | −11 |
| *113 | 50.0 | 35.0 | 15 | LaO$_{3/2}$ | 5.0 | — | <100 | — |
| *114 | 45.0 | 20.0 | 35 | LaO$_{3/2}$ | 5.0 | — | <100 | — |

*; shows the samples outside the present invention.

TABLE 3

| Sample No. | Main components (mole %) | | | Additive (mole parts) | | Dielectric constant (εr) | Q value | Temperature coefficient (τf) of resonant frequency (ppm/°C.) |
|---|---|---|---|---|---|---|---|---|
| | BaO | MgO | WO$_3$ | | | | | |
| 115 | 50 | 25 | 25 | CeO$_2$ | 0.1 | 19.7 | 7900 | −29 |
| 116 | 50 | 25 | 25 | CeO$_2$ | 2.0 | 18.8 | 3500 | −28 |
| 117 | 50 | 25 | 25 | CeO$_2$ | 5.0 | 19.3 | 5500 | −26 |
| 118 | 50 | 25 | 25 | CeO$_2$ | 15.0 | 19.2 | 7000 | −26 |
| 119 | 50 | 25 | 25 | CeO$_2$ | 20.0 | 18.8 | 3300 | −24 |
| *120 | 50 | 25 | 25 | CeO$_2$ | 30.0 | — | <100 | — |
| 121 | 53.6 | 20.3 | 26.1 | CeO$_2$ | 11.6 | 18.5 | 6500 | −25 |
| 122 | 60.6 | 13.1 | 26.3 | CeO$_2$ | 26.3 | 18.2 | 3800 | −18 |
| *123 | 63.4 | 10.3 | 26.3 | CeO$_2$ | 32.0 | — | <100 | — |
| *124 | 35.0 | 40.0 | 25.0 | CeO$_2$ | 5.0 | 18.5 | 1000 | — |
| 125 | 40.0 | 35.0 | 25.0 | CeO$_2$ | 5.0 | 18.3 | 3200 | −9 |
| 126 | 40.0 | 40.0 | 20.0 | CeO$_2$ | 5.0 | 17.8 | 3300 | −1 |
| *127 | 35.0 | 45.3 | 20.0 | CeO$_2$ | 5.0 | — | <100 | — |
| 128 | 50.0 | 20.0 | 30.0 | CeO$_2$ | 5.0 | 17.6 | 3000 | −17 |
| *129 | 50.0 | 35.0 | 15 | CeO$_2$ | 5.0 | — | <100 | — |
| *130 | 45.0 | 20.0 | 35 | CeO$_2$ | 5.0 | — | <100 | — |
| 131 | 50 | 25 | 25 | NdO$_{3/2}$ | 0.1 | 20.3 | 5700 | −20 |
| 132 | 50 | 25 | 25 | NdO$_{3/2}$ | 2.0 | 19.7 | 4300 | −4 |
| 133 | 50 | 25 | 25 | NdO$_{3/2}$ | 5.0 | 20.0 | 4400 | 0 |
| 134 | 50 | 25 | 25 | NdO$_{3/2}$ | 15.0 | 19.5 | 4900 | +5 |
| 135 | 50 | 25 | 25 | NdO$_{3/2}$ | 20.0 | 19.4 | 3400 | +13 |
| *136 | 50 | 25 | 25 | NdO$_{3/2}$ | 30.0 | — | <100 | — |
| 137 | 49.7 | 24.2 | 26.0 | NdO$_{3/2}$ | 3.6 | 19.2 | 9300 | −3 |
| 138 | 51.6 | 22.4 | 26.1 | NdO$_{3/2}$ | 7.5 | 19.6 | 7700 | +15 |
| 139 | 53.6 | 20.3 | 26.1 | NdO$_{3/2}$ | 11.6 | 19.3 | 8400 | +28 |
| 140 | 55.7 | 18.1 | 26.2 | NdO$_{3/2}$ | 16.1 | 18.9 | 6200 | +40 |
| 141 | 58.1 | 15.7 | 26.2 | NdO$_{3/2}$ | 21.0 | 19.0 | 5900 | +52 |
| 142 | 60.6 | 13.1 | 26.3 | NdO$_{3/2}$ | 26.3 | 19.1 | 4100 | +60 |
| *143 | 63.4 | 10.3 | 26.3 | NdO$_{3/2}$ | 32.0 | 18.6 | 1300 | +65 |
| *144 | 35.0 | 40.0 | 25.0 | NdO$_{3/2}$ | 5.0 | 18.3 | 800 | — |
| 145 | 40.0 | 35.0 | 25.0 | NdO$_{3/2}$ | 5.0 | 18.8 | 3300 | +16 |
| 146 | 40.0 | 40.0 | 20.0 | NdO$_{3/2}$ | 5.0 | 18.1 | 3500 | +23 |
| *147 | 35.0 | 45.0 | 20.0 | NdO$_{3/2}$ | 5.0 | — | <100 | — |
| 148 | 50.0 | 20.0 | 30.0 | NdO$_{3/2}$ | 5.0 | 17.9 | 3000 | +6 |
| *149 | 50.0 | 35.0 | 15 | NdO$_{3/2}$ | 5.0 | — | <100 | — |
| *150 | 45.0 | 20.0 | 35 | NdO$_{3/2}$ | 5.0 | — | <100 | — |
| 151 | 50 | 25 | 25 | PrO$_{11/6}$ | 0.1 | 20.3 | 11000 | −21 |
| 152 | 50 | 25 | 25 | PrO$_{11/6}$ | 2.0 | 20.4 | 8400 | +6 |
| 153 | 50 | 25 | 25 | PrO$_{11/6}$ | 5.0 | 21.2 | 4100 | +16 |
| 154 | 50 | 25 | 25 | PrO$_{11/6}$ | 15.0 | 20.1 | 3700 | +15 |

TABLE 3-continued

| Sample No. | Main components (mole %) | | | Additive (mole parts) | | Dielectric constant ($\epsilon r$) | Q value | Temperature coefficient ($\tau f$) of resonant frequency (ppm/°C.) |
|---|---|---|---|---|---|---|---|---|
| | BaO | MgO | WO$_3$ | | | | | |
| 155 | 50 | 25 | 25 | PrO$_{11/6}$ | 20.0 | 20.0 | 2500 | +21 |
| *156 | 50 | 25 | 25 | PrO$_{11/6}$ | 30.0 | — | <100 | — |
| 157 | 49.7 | 24.2 | 26.0 | PrO$_{11/6}$ | 3.6 | 20.1 | 7500 | +5 |
| 158 | 51.6 | 22.4 | 26.1 | PrO$_{11/6}$ | 7.5 | 19.5 | 9200 | +18 |
| 159 | 53.6 | 20.3 | 26.1 | PrO$_{11/6}$ | 11.6 | 19.7 | 8300 | +24 |
| 160 | 55.7 | 18.1 | 26.2 | PrO$_{11/6}$ | 16.1 | 19.5 | 7100 | +35 |
| 161 | 58.1 | 15.7 | 26.2 | PrO$_{11/6}$ | 21.0 | 19.3 | 5900 | +48 |
| 162 | 60.6 | 13.1 | 26.3 | PrO$_{11/6}$ | 26.3 | 18.9 | 3700 | +57 |
| *163 | 63.4 | 10.3 | 26.3 | PrO$_{11/6}$ | 32.0 | 18.7 | 1800 | +65 |
| *164 | 35.0 | 40.0 | 25.0 | PrO$_{11/6}$ | 5.0 | 18.5 | 1000 | — |
| 165 | 40.0 | 35.0 | 25.0 | PrO$_{11/6}$ | 5.0 | 19.2 | 3800 | +29 |
| 166 | 40.0 | 40.0 | 20.0 | PrO$_{11/6}$ | 5.0 | 18.2 | 3700 | +41 |
| *167 | 35.0 | 45.0 | 20.0 | PrO$_{11/6}$ | 5.0 | — | <100 | — |
| 168 | 50.0 | 20.0 | 30.0 | PrO$_{11/6}$ | 5.0 | 17.2 | 3200 | +22 |
| *169 | 50.0 | 35.0 | 15 | PrO$_{11/6}$ | 5.0 | — | <100 | — |
| *170 | 45.0 | 20.0 | 35 | PrO$_{11/6}$ | 5.0 | — | <100 | — |
| 171 | 50 | 25 | 25 | SmO$_{3/2}$ | 0.1 | 20.1 | 9700 | −23 |
| 172 | 50 | 25 | 25 | SmO$_{3/2}$ | 2.0 | 19.9 | 4900 | −6 |
| 173 | 50 | 25 | 25 | SmO$_{3/2}$ | 5.0 | 20.4 | 3400 | +19 |
| 174 | 50 | 25 | 25 | SmO$_{3/2}$ | 15.0 | 18.6 | 3800 | +14 |
| *175 | 50 | 25 | 25 | SmO$_{3/2}$ | 30.0 | — | <100 | — |
| 176 | 49.7 | 24.2 | 26.0 | SmO$_{3/2}$ | 3.6 | 19.9 | 9600 | +5 |
| 177 | 51.6 | 22.4 | 26.1 | SmO$_{3/2}$ | 7.5 | 19.7 | 8300 | +15 |
| 178 | 53.6 | 20.3 | 26.1 | SmO$_{3/2}$ | 11.6 | 20.2 | 7500 | +28 |
| 179 | 55.7 | 18.1 | 26.2 | SmO$_{3/2}$ | 16.1 | 19.8 | 6400 | +37 |
| 180 | 58.1 | 15.7 | 26.2 | SmO$_{3/2}$ | 21.0 | 19.6 | 5100 | +47 |
| 181 | 60.6 | 13.1 | 26.3 | SmO$_{3/2}$ | 26.3 | 19.9 | 3300 | +55 |
| *182 | 63.4 | 10.3 | 26.3 | SmO$_{3/2}$ | 32.0 | 19.8 | 2100 | +62 |
| *183 | 35.0 | 40.0 | 25.0 | SmO$_{3/2}$ | 5.0 | 18.2 | 1000 | — |
| 184 | 40.0 | 35.0 | 25.0 | SmO$_{3/2}$ | 5.0 | 19.5 | 4000 | +31 |
| 185 | 40.0 | 40.0 | 20.0 | SmO$_{3/2}$ | 5.0 | 18.4 | 3600 | +39 |
| *186 | 35.0 | 45.0 | 20.0 | SmO$_{3/2}$ | 5.0 | — | <100 | — |
| 187 | 50.0 | 20.0 | 30.0 | SmO$_{3/2}$ | 5.0 | 17.4 | 3500 | +25 |
| *188 | 50.0 | 35.0 | 15 | SmO$_{3/2}$ | 5.0 | — | <100 | — |
| *189 | 45.0 | 20.0 | 35 | SmO$_{3/2}$ | 5.0 | — | <100 | — |

*; shows the samples outside the present invention.

As is clear from Tables 1 to 3, samples prepared by including the specific metal element selected from Y, Ti, Zr, Sn, Mn, Ca, Hf, La, Ce, Nd, Pr and Sm show that the temperature coefficient ($\tau f$) of resonance frequencies was changed in a positive direction in comparison with a sample not including the above metal element (No. 1).

Furthermore, it can be understood that according to the amount added of the specific metal element, the value of the temperature coefficient ($\tau f$) can be adjusted to a suitable value.

Especially when Y is added in an amount of 0.1 to 30 mole parts, La, Ce, Na, Pr or Sm is added in an amount of 0.1 to 26.3 mole parts, Zr is added in an amount of 0.1 to 20 mole parts, Mn, Sn or Ti is added in an amount of 0.1 to 10 mole parts, and Ca is added in an amount of 0.1 to 15 mole parts, the temperature coefficient ($\tau f$) of a resonance frequency can be transferred from a negative side to a positive direction, and the Q value can be maintained at a high value of at least 3000. When Y or La is added in an amount of 0.1 to 20 mole parts, or Nd, Pr or Sm is added in an amount of 0.1 to 15 mole parts, a temperature coefficient ($\tau f$) of ±30 ppm and a Q value of at least 3000 may be obtained.

What is claimed is:

1. A dielectric ceramic composition for high frequency-use comprising a composition (A) containing at least Ba, Mg and W as metal elements represented by a composition formula expressed in a mole ratio of these metal elements, xBaO, yMgO, zWO$_3$, in which x, y and z satisfy the following relations:

$40 \leq x \leq 60$,
$13 \leq y \leq 40$,
$20 \leq z \leq 30$, and
$x + y + z = 100$ and at least one element (B) selected from Group 3b elements in the periodic tablet, Group 4b elements in the periodic table, Sn, Mn and Ca, wherein the total proportion of the element (B) is less than or equal to 30 mole parts per 100 mole parts of the composition (A) and wherein said dielectric ceramic composition exhibits a Q value of at least 3000.

2. A dielectric ceramic composition for high frequency-use of claim 1 wherein the element (B) is at least one member selected from Group 3b elements in the periodic table, and the proportion of the element (B) is 0.1 to 30 mole parts per 100 mole parts of the composition (A).

3. A dielectric ceramic composition for high frequency-use of claim 2 wherein the element (B) is yttrium.

4. A dielectric ceramic composition for high frequency-use of claim 1 or 2 wherein the element (B) is any one member selected from La, Ce, Nd, Pr and Sm, and the proportion of the element (B) is 0.1 to 26.3 mole parts per 100 mole parts of the composition (A).

5. A dielectric ceramic composition for high frequency-use of claim 1 wherein the element (B) is any one member selected from Group 4b elements of the periodic table, Sn, Mn and Ca, and the proportion of the element (B) is 0.1 to 20 mole parts per 100 mole parts of the composition.

6. A dielectric ceramic composition for high frequency-use of claim 5 wherein the element (B) is Ca, and the proportion of the element (B) is 0.1 to 15 mole parts per 100 mole parts of the composition (A).

7. A dielectric ceramic composition for high frequency-use of claim 1 or 5 wherein the element (B) is any one member selected from Mn, Sn and Ti, and the proportion of the element (B) is 0.1 to 10 mole parts per 100 mole parts of the composition (A).

8. A dielectric ceramic composition for high frequency-use of claim 1 wherein the elements (B) are Mn and Y in combination.

* * * * *